United States Patent [19]
Elder

[11] Patent Number: 5,660,212
[45] Date of Patent: Aug. 26, 1997

[54] INTEGRAL HVAC REINFORCED DUCT SYSTEM AND METHOD FOR REINFORCING DUCT

[76] Inventor: William Elder, 2311 Thousand Oaks Dr., Richmond, Va. 23294

[21] Appl. No.: 125,330

[22] Filed: Sep. 22, 1993

[51] Int. Cl.$^6$ ............................................. F16L 9/00
[52] U.S. Cl. ..................... 138/157; 138/172; 138/177; 138/DIG. 4
[58] Field of Search ....................... 138/157, 162, 138/163, 156, 177, DIG. 4, 172, 173; 285/363, 36, 406, 424

[56] References Cited

U.S. PATENT DOCUMENTS

| | | | |
|---|---|---|---|
| 1,189,208 | 6/1916 | Hodkinson | 138/157 |
| 1,484,491 | 2/1924 | Gutermann | 285/406 |
| 2,396,826 | 3/1946 | Callan | 138/157 |
| 2,916,054 | 12/1959 | Callan | 138/162 |
| 3,428,342 | 2/1969 | Chambers | 285/406 X |
| 3,630,549 | 12/1971 | Grimm | 285/364 X |
| 4,461,499 | 7/1984 | Hunter et al. | 285/364 |
| 4,466,641 | 8/1984 | Heilman et al. | 285/364 X |
| 4,509,778 | 4/1985 | Arnoldt | 285/406 |
| 4,564,227 | 1/1986 | Murck | 285/406 X |
| 4,579,375 | 4/1986 | Fischer et al. | 285/364 X |
| 5,125,199 | 6/1992 | Whitney et al. | 138/157 X |

*Primary Examiner*—Patrick Brinson
*Attorney, Agent, or Firm*—R. Winston Slater

[57] ABSTRACT

A method and structure for the integral reinforcement of HVAC ducting including the steps of laying out one or more planar sheet metal blanks having portions defined therein dedicated for integral rib reinforcement; placing relief slots in the dedicated portions of the blank corresponding to the seams and folding lines; forming the integral reinforcement rib from the dedicated blank material; bending the blanks along fold lines and assembling the rectangular duct; and placing rib corners over the reinforcing rib ends at the corners of the duct. Alternatively, the step of cutting the reinforcing rib at the fold lines may be substituted for the step of placing slots in the blank. The completed structure includes reinforcing ribs circumferentially positioned around the duct or on the planar duct surfaces, the ribs being formed of, and integral to, the duct itself. Pre-manufactured rib corners serve to seal and strengthen the reinforcement ribs as required.

6 Claims, 3 Drawing Sheets

INTEGRAL HVAC REINFORCED DUCT SYSTEM AND METHOD FOR REINFORCING DUCT

BACKGROUND OF THE INVENTION

The present invention relates to heating, ventilating and air conditioning ("HVAC") duct and, more specifically, to an integrally reinforced rectangular duct system and to the related improved method for reinforcing rectangular duct.

It is well-known that longer and larger cross-section HVAC ducts require transverse reinforcement spaced along the lengths thereof. The specific reinforcement requirements, which depend on many factors including joint type, system air pressure, gage of material and finished duct size, are set by industry standards and building codes, for example, as found in the manual HVAC Duct Construction Standards, Metal & Flexible published by SMACHNA, the Sheet Metal and Air Conditioning Contractors' National Association, Inc. headquartered in Merrifield, Va. Further consideration of the specific SMACHNA standards is beyond the scope of this application. Rather, the present invention pertains to a system of duct reinforcement when such reinforcement, in accordance with SMACHNA or other applicable standards, is required.

For the present it is sufficient to observe that duct reinforcement may be defined either at the ends of a duct section—in the form of duct section connecting joints—or at spaced intermediate locations along the length of a given duct section. To the extent that short duct sections are employed, with the corresponding increase in the number of 'inherently-reinforced' joints, additional, intermediate reinforcement may not be required.

Unfortunately, the cost of such joints and of the labor to fabricate and assemble them, significantly limits the efficacy of the 'joint' approach to duct reinforcement. The present invention, therefore, is directed to an economical system for intermediate duct reinforcement that facilitates use of longer and larger ducts and/or of ducts fabricated from less expensive lower gage sheet metal stock.

Many forms of intermediate duct reinforcement have been proposed and are in common use today including several shown in the previously noted SMACHNA manual. But without exception each known system is either time or material intensive —often requiring substantial labor, first, to fabricate the reinforcement assemblies, thereafter, to position and secure the assemblies to the duct.

Probably the most common form of reinforcement is conventional 'angle', 'zee', or 'channel' iron, which iron is pre-fabricated into rectangular reinforcement loops or brackets then positioned around the duct transversely to the direction of air flow. See, for example, U.S. Pat. No. to Godshalk, No. 3,202,184. A brief review of the steps required to implement this prior art system of reinforcement quickly reveals the shortcomings of the approach. First, appropriate angle must be inventoried. And while inventorying may seem trivial, it involves myriad activities including, first, monitoring inventory levels and purchasing additional stock as required. Labor and the possibility of oversight, i.e. the failure to timely order needed angle, are inherent.

Next, the uncut angle stock is delivered in relatively long and heavy sections that must be unloaded (more labor) and stored in appropriate racks (using shop space too often already in short supply). These steps represent just the beginning.

Actual fabrication is at least as labor intensive. First, the ungainly angle must again be handled, measured and severed into appropriate sections—generally four per reinforcement assembly—and the unused angle returned to storage. Holes are generally required in the angle for assembly and installation of the reinforcement member. Further, reinforcement members are typically 'preassembled' prior to installation onto the duct and therefore the four angle pieces must be positioned and aligned—usually on a jig—thereafter, bolted and/or welded together. Finally the preassembled reinforcement member must be slid into position on the duct and appropriately affixed thereto.

A further limitation of the above-described angle system of reinforcement relates to whether the duct is to be shipped to the job site completely fabricated or 'knocked down', that is, to what extent must field, as opposed to shop, personnel be employed to install the reinforcement assemblies. (It is generally preferable to limit on-site duct fabrication to final assembly and installation of the 'knocked down' duct.) In this connection it will be appreciated that shipment of completed rectangular duct may be impractical in view of the large size (volume) of such completed duct—one ships mostly 'air' in this assembled configuration. For this reason, duct is generally shipped 'knocked down' and nested. And as a consequence, the preassembled, rectangular angle reinforcement assembly must generally be field installed.

Another well-known reinforcement scheme which as above, also requires substantial on-site installation is the 'tie rod'. Tie rods are, literally, rods positioned inside the duct and attached between parallel side panels to preclude duct-ballooning or 'oil-canning' as it is known in the trade. Tie rods work well, but again reflect high fabrication/installation labor particularly, where the rods are secured by the welding of appropriate brackets to the interior duct wall surfaces.

In view of the foregoing, it is not surprising that less labor-intensive reinforcing solutions have been proposed. One such solution is the formed sheet metal reinforcement of Greiner, U.S. Pat. No. 4,621,661. Greiner is directed to solving the same problem herein described and, indeed, Greiner confirms that it is often less expensive to make a particular piece of duct from a heavier gage material if such increase obviates the need for intermediate reinforcement.

Greiner proposes a pair of stiffeners oriented transversely across the two sides of a rectangular duct (the long sides), the stiffeners being formed from sheet metal and affixed to the duct using a punch/die tool that places successive 'dimples' along the length of the stiffener and through the several layers of sheet metal (layers comprising both duct and stiffener). Unquestionably Greiner performs a 'stiffening' function and, in so doing, minimizes certain of the above-noted problems, for example, the need to order and handle angle stock. But Greiner does not disclose a full circumferential reinforcement system (i.e. four sides) nor the mechanism for interconnecting the corners of such a system. Further, Greiner still requires the processing and handling of separate reinforcement members. And probably the greatest obstacle to industry acceptance of the Greiner system has been the cost of the 'dimple' machinery and the cumbersomeness in handling and positioning the sheet metal pieces during the dimpling process.

The present invention relates to a method and structure for transversely reinforcing rectangular duct—circumferentially around all four sides of the duct—and without the need to inventory, handle or 'pre-fabricate' angle iron or other reinforcing material. Indeed, the present invention defines an integral reinforcement rib whereby the reinforcer, itself, is fabricated of sheet metal material but, unlike Greiner, the requisite rib material is defined within, and as part of, the sheet metal blank(s) that comprise the completed fitting. As a consequence of this construction, the entire fitting, including the reinforcement ribs, may be fabricated through a series of roll-forming or similar automated procedures.

Substantially all fabrication of the duct, including its integral reinforcement ribs, is performed in the shop with the duct, thereafter, being shippable in 'knocked down' form to the job site. All that is required on-site is the placement of standard, mass-produced 'rib corners' onto and at the corners of the integral duct reinforcement ribs.

It is customary to fabricate straight duct sections in lengths corresponding to the width of coil stock available in order to minimize material waste (e.g. 4' or 5'). The same is true for the present integrally reinforced duct system, although a small portion of this width must be 'ear-marked' for the integral rib which, consequently, results in a slightly shorter finished duct section. The present duct may be fabricated, in the same manner as conventional duct, from a single wrap-around blank or from L-shaped or other conventional multi-blank topologies.

Most typically the present duct will incorporate a single transverse reinforcement rib (i.e. circumferentially around all four duct sides or across the planar sides of flat-oval duct), positioned midway along the length of the duct. For duct fabricated from five foot coil stock, the rib would be positioned approximately 30 inches from the ends thereof.

It will be appreciated that the amount of material 'dedicated' to the reinforcement rib, and therefore the height of the rib itself may be selected according to the reinforcement mandated—the higher the rib, the more reinforcement strength provided. A rib height may advantageously be selected to correspond to the dimensions of the end joints, for example, 1⅜" for the "TDC" joint manufactured by The Lockformer Company/Iowa Precision Industries, Inc.

According to a preferred embodiment of the present duct, the rib will be automatically machine fabricated by auto-braking or roll-forming each duct sheet thereby transforming the so-called 'dedicated' portion of the sheet into a rib, extending perpendicularly from the duct surface, and comprised of upwardly and downwardly folded metal, i.e. a rib of double thickness. The 'dedicated' portion of the blank(s) is the substantially rectangular region defined across the entire width of each blank, midway between the opposed ends and of length equal to twice the intended rib height. Thus, as noted, the overall length of the finished duct section will be correspondingly shortened by this length of 'dedicated' material, i.e. again, by twice the height of the rib.

Conventional rectangular duct blank(s) cannot be directly utilized in conjunction with the integral reinforcement of the present invention. Additional steps of 'blanking' relief slots and notches in the 'dedicated' portion of the duct blank along the seam edges and intended fold lines are required to permit subsequent duct fabrication. Fortunately these additional steps may be automated and performed on tooled punch equipment or, alternatively, as part of the original blank cutting program (e.g. utilizing computer aided design and computer-controlled plasma cutting apparatus) and therefore such steps represent, at most, only trivial added labor elements.

The importance of these relief slots/notches cannot be understated as the very integrity and reinforcing function of the integral rib would otherwise preclude the bending required, for example, to fabricate the two L-shaped components of this popular duct topology. See by way of contrast the drainage culvert of Smith, U.S. Pat. No. 1,057,098, in which a relatively low rib is, and in the absence of the present relief slots must be, deformed to create the desired circular culvert contour. Further, the seam material in the 'dedicated' portion of the blank must especially be removed by reason that the seam—which is ordinarily fabricated as a multi-layer interface (e.g. a Pittsburgh)—will preclude rib roll-forming or, at the least, will result in a misformed bulbous rib of four or more layers.

One further step contemplated to properly implement the integral rib of the present invention is the spot welding or other securement of the dual-thickness ribs to assure the integrity of these ribs, i.e. that the ribs surfaces do not separate, under ordinary loads. Again, however, this securement step may include 'dimpling' or similar affixation as part of the rib roll-forming process or, at least, as an added integral station to the roll-forming line. As such, this step does not significantly diminish nor detract from the low-labor/low-cost cornerstones of the present technology.

It will be noted that the above-described fabrication is both automated and shop-based. The duct sub-sections, e.g. the L-shaped duct components, may be nested and shipped 'knocked down' to the job site for final assembly and installation per standard practice. Very little has to be performed on the job site in connection with the reinforcement of the present invention.

The single exception is the installation of the rib corners—which installation generally follows the final on-site assembly of the duct. But even here, little complexity or labor is involved. The rib corners are in the first instance designed for inexpensive, mass production and therefore are available at the job-site as purchased, no-labor items. Advantageously, and to the extend /that the present invention is implemented utilizing a single or limited number of rib heights, a standard 'one-size-fits-all' corner can be used on all reinforced ducts, regardless of duct cross-section.

A principal function of the rib corner is to seal the ends of the rib against air leakage. (Leakage is generally not a problem associated with 'joint' corners by reason that the full transverse seal required at joints precludes entry of air into the joints and joint corners.) The rib corner may perform a secondary 'strengthening' function by reason of its rigid attachment to the pair of ribs that converge to near-intersection at each duct corner. In any event, the rib corner is preferably provided with sealing material therein, e.g. closed-cell neoprene, and designed for 'slip-on' attachment over the reinforcement ribs. It is contemplated that a dimpling tool or 'twist-lock' tool, as more folly described below, may advantageously be employed to efficaciously lock the corner in position consistent with the low-cost/labor objectives of the present invention.

It is therefore an objective of the present invention to provide a method and structure for duct reinforcement that is both efficacious in performance and inexpensive in construction taking into consideration all of the costs associated therewith including material, material handling, fabrication and assembly, both in-shop and on-site. To this end it is a further object to minimize use of separate reinforcing material, particularly material that requires special inventorying, handling and prefabrication. It is an object to utilize standard sheet metal for duct reinforcing and to make the reinforcement integral to the duct. It is a further object to minimize on-site labor in connection with the reinforcement of duct and therefore to the extent that post-shop fabrication is required it is an object to employ standardized and/or prefabricated components that may be field-installed without significant further fabrication or installation time.

DESCRIPTION OF THE PREFERRED EMBODIMENT

Figure 1:
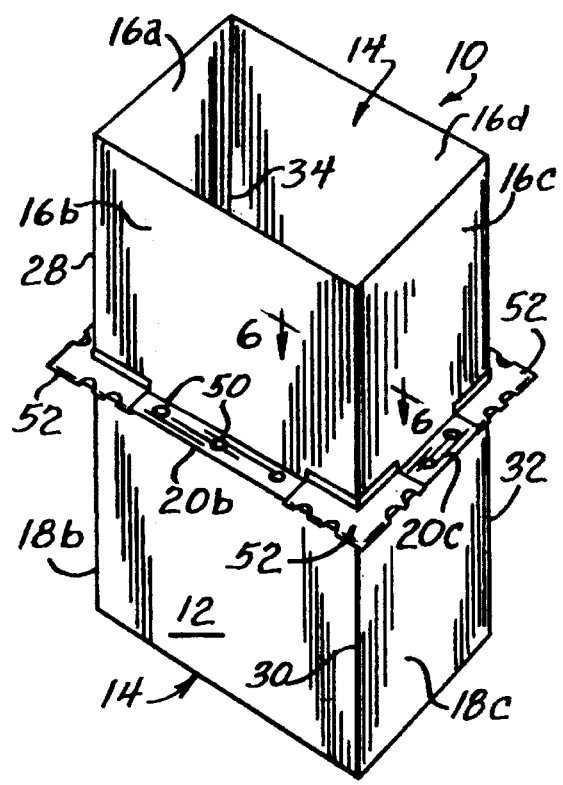
FIG. 1 is a perspective view of a straight rectangular duct section employing the integral duct reinforcement of the present invention.

FIG. 1 is a perspective view of the integrally reinforced rectangular duct 10 of the present invention. For the purposes of the present disclosure, duct 10 is fabricated from a single piece of sheet metal stock 12 three folded backup upon itself in the well-known 'wrap-around' configuration. It will be understood that the reinforcement teachings set forth hereinafter apply equally to ducts whether formed as a single wrap-around piece 12, as a pair of L-shaped components (a more common format that does not require special fabrication tools), as a two-piece U-shaped plus fourth side assembly, or as four separate pieces. It should also be appreciated that the present invention has applicability to any duct type (cross-sections) having one or more planar sides, for example, flat-oval duct.

For purposes of clarity, duct 10 is described and shown as comprising four upper duct panels, 16a–d, and four lower duct panels 18a–d. It will be appreciated, however, that the rectangular duct depicted (FIG. 1) is actually fabricated from a single blank 12 (see FIG. 4) and that the above-identified panels 16 and 18, as well as the transverse reinforcement ribs discussed hereinafter, are all integrally defined within this single blank 12.

Figure 5:
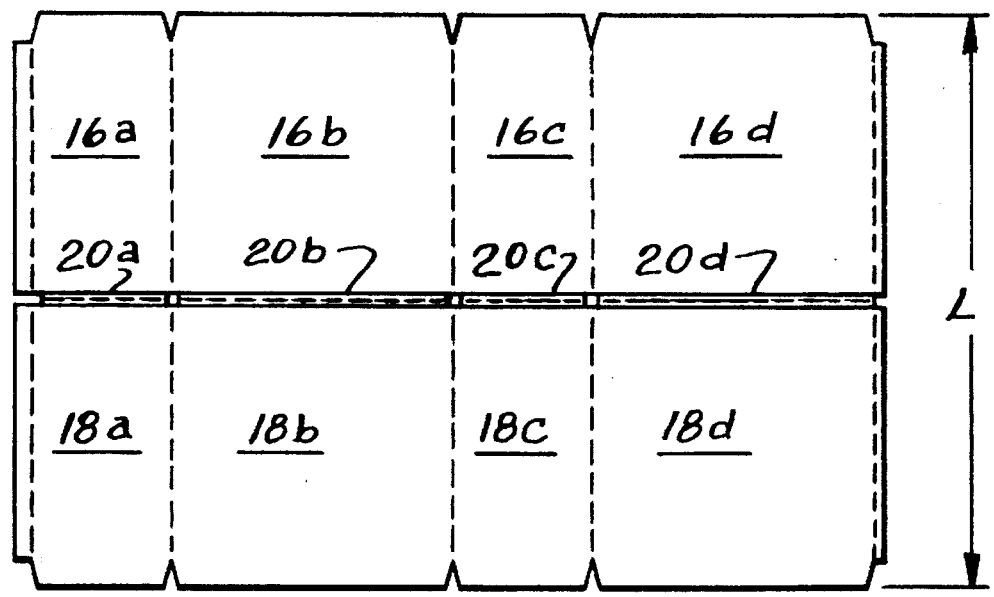
FIG. 5 is a top plan view of the sheet metal blank of FIG. 4 after the reinforcement ribs have been formed therein.

Referring to FIGS. 1 and 5, four reinforcement ribs 20a–d, are integrally formed in the respective sides of the duct, transverse to the air flow therethrough and substantially centered between the opposed inlets 14. Although a single circumferential transverse rib is shown, it will be understood that multiple spaced ribs may be formed according to the teachings herein.

Figure 3:
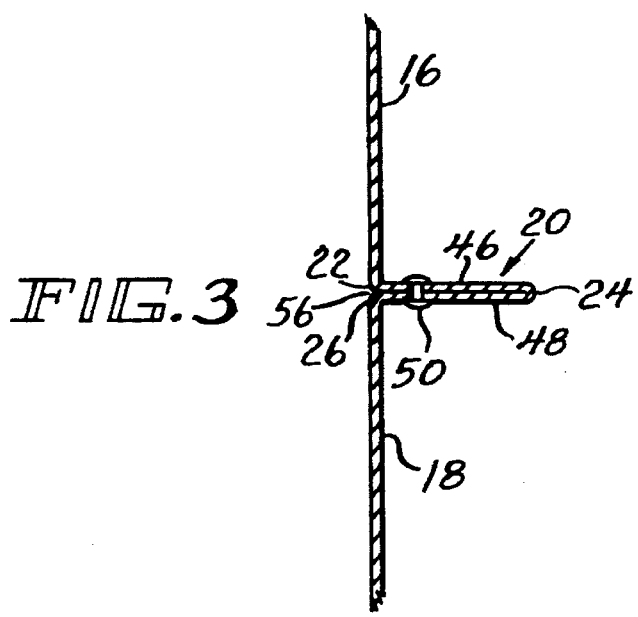
FIG. 3 is a sectional view of the integral reinforcing rib of the present invention taken along line 3—3 of FIG. 2.
Figure 4:
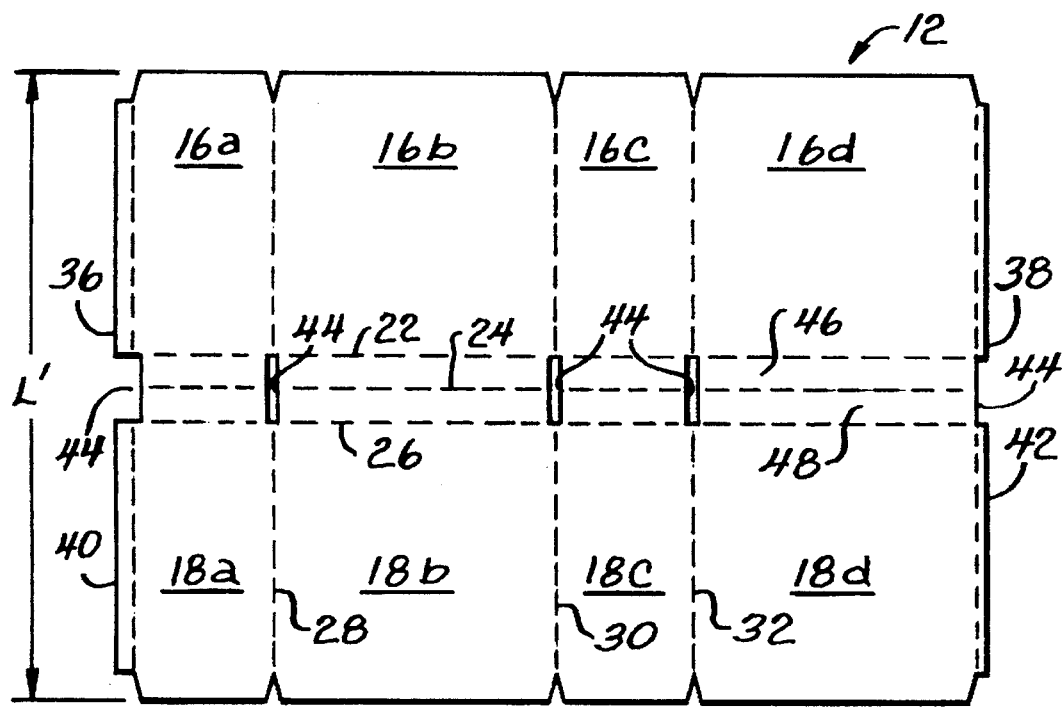
FIG. 4 is a top plan view of a sheet metal blank used to form a wrap-around rectangular fitting of the type shown in FIG. 1.

The three horizontal dotted lines 22,24, and 26 shown in FIG. 4 represent pre-fabrication fold or roll-forming lines which, following rib formation, become the rib edges illustrated in FIG. 3. The sheet material defined between lines 22 and 26 is dedicated for and, through this fabrication process, converted into the reinforcing rib 20. Consequently, the overall length of the completed duct section (length L as shown in FIG. 5) is correspondingly reduced from its initial, pre-fabrication length L' (FIG. 4)—generally, the width of the coil stock used. It is a significant aspect of the present invention that the above-described reinforcement rib 20 may be fabricated on automated brake or roll-forming machinery thereby facilitating rib fabrication at minimum labor expenditure.

Referring again to the sheet metal blank 12 of FIG. 4, vertical dotted lines 28,30,32 represent the fold lines which, upon braking, become the corresponding three corners of the finished duct 10 (FIG. 1 ). The fourth corner 34 is formed by mating the opposed side edges 36 and 38 using conventional seam technology. Sufficient material 40 and 42 is provided along these edges as dictated by the seam type selected. The seam edges are generally formed prior to the above-described fabrication of the integral rib while the steps of folding of the blank 12 into its final rectangular duct shape and completing the seam along corner 34 are performed after the above-described automated fabrication of the reinforcement rib 20.

Consequently, relief slots 44 must be positioned along each of the fold lines 28,30,32 and in the seam material at the edges 36,38 covering the full length of the dedicated rib material (i.e. between lines 22 and 26). These slots permit separation of the respective rib section 20a,d upon folding of the duct which step, as noted, occurs after rib formation. It will be appreciated that in the absence of such slots, the rib itself would preclude duct bending. Alternatively, rib 20 may be notched or cut following rib formation to achieve the required relief. 'Pre-notching' of the blank is preferred, however, by reason that these slots can be incorporated into the initial blank-fabricating process, either by plasma or similar cutting or by automated tooled blanking thereof. In any event, the notches must be placed in the seam prior to formation by reason, as previously noted, of the folding or roll-forming of the seam material which, in the absence of such notching, would result in a rib having enlarged ends of multi-layer thickness.

FIG. 3 details the integral rib 20 of the present invention. Specifically, the correspondence between the fold lines 22,24,26 of the raw blank (FIG. 4) and the formed rib 20 (FIG. 3) is readily apparent. It will be further noted that rib 20 (of height equal to half the distance between fold lines 22 and 24) is comprised of two layers of sheet material 46 and 48, juxtaposed upon the folding-back of the blank upon itself during the previously described step of rib fabrication. The specific rib height is chosen according to the several factors outlined in the background portion of the present specification.

The respective ribs layers 26 and 48 may be tack-welded, dimpled, riveted or otherwise secured at spaced points 50 along the rib to preclude the splitting separation of the rib under certain duct loading conditions. Tack-welding or dimpling is preferred by reason of the ease of application and the fact that the duct/rib walls are not breached thereby. In this latter connection it will be appreciated that each rib section is air-tight along its length (requiring sealing, as discussed below, only at its ends) and therefore puncturing of the rib should be avoided. Preferably the welding or dimpling step is incorporated into the rib formation step or, at the very least, added as a subsequent automated station thereby minimizing further labor. Rib securements 50 may be obviated in certain smaller ducts or where the gage of material and/or the positioning of rib corners (discussed below) limit rib separation.

Figure 6:
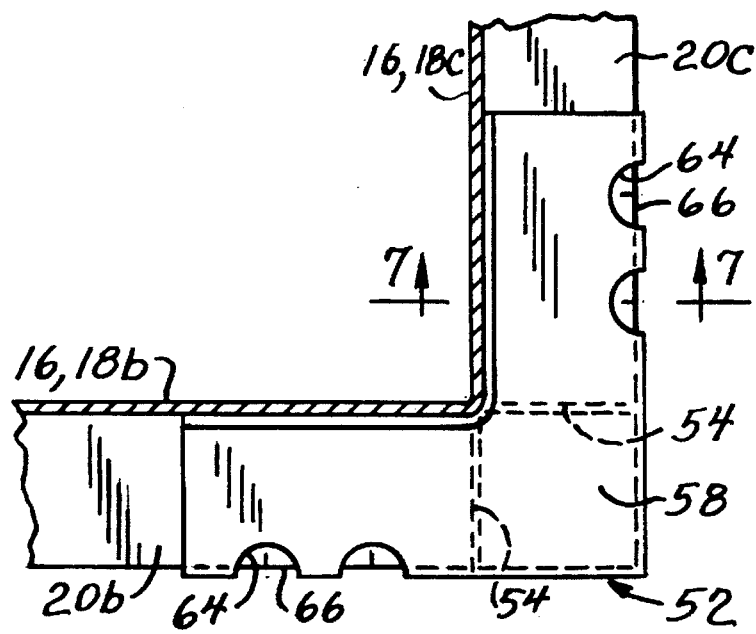
FIG. 6 is a fragmentary sectional view of one corner of the integral reinforcing rib of the present invention taken along line 6—6 of FIG. 1; and, FIG. 7 is a sectional view detailing the reinforcing rib and corner member taken along line 7—7 of FIG. 6.
Figure 7:
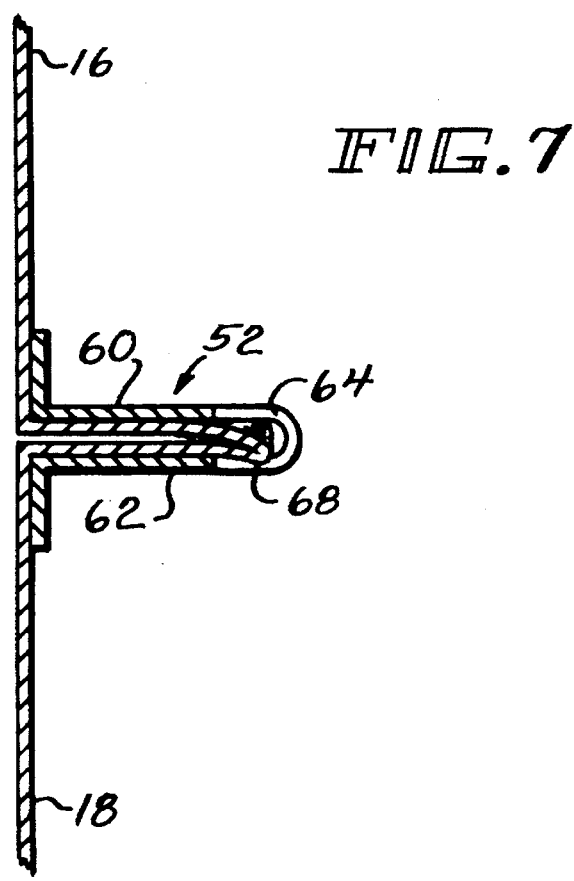

As shown in FIG. 1, four rib corners 52 may be positioned over the near-intersecting rib sections 20a–d at each duct corner. FIGS. 6 and 7 further illustrate the placement of corners 52 and one preferred construction and method of attachment. In certain duct configurations, particularly those including non-planar sides such as flat-oval duct, corners 52 may be omitted and flanges or other components may be substituted therefor.

Figure 2:
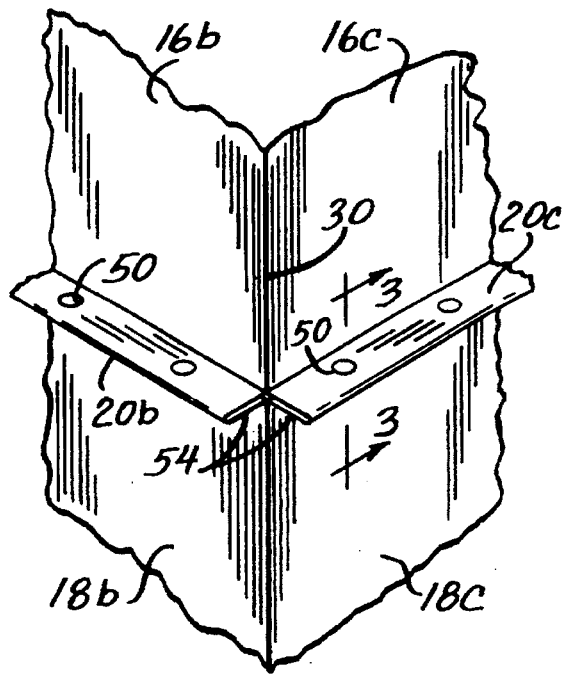
FIG. 2 is a fragmentary perspective view of one corner of the duct section of FIG. 1 with the reinforcement rib corner removed.

The function of rib corners 52 is best understood by a review of FIG. 2 in which the reinforcing rib structure (at the corners) is shown prior to placement of the rib corners thereon. Two aspects of this corner intersection are manifest.

First, the individual rib sections, ribs 20b and 20c in the present example, do not actually engage or intersect. Second, the ends 54 of the adjacent rib sections are open and consequently represent air leakage points if not properly sealed. As outlined below, rib corners 52 may advantageously provide both sealing and strengthening functions.

Ribs 20 may be sealed in a variety of ways not necessarily associated with the rib corners 52, for example,. by welding or by placing a high-pressure duct sealer/adhesive thereon. Unfortunately such sealing techniques, in particular welding, remain labor intensive, including, on-site labor.

Two alternative methods of sealing are proposed, each believed to minimize labor and expense. One method works in cooperation with the rib corner 52 and the other functions independently of rib corner attachment. This latter sealing method involves the placement of a strip of insulation or sealing material at 56 (FIG. 3) between the respective rib layers 46 and 48. More specifically, the sealing strip is placed into the rib during, for example, the roll-forming fabrication of the rib and, as a consequence, rib sealing is combined with the roll-forming step thereby achieving the desired seal with minimum labor involvement.

In the second alternative approach, sealing material 58, for example a closed-cell neoprene gasket, is placed in the rib corner 52, preferably in the corner of the corner, and is thereafter forced into sealing engagement with the rib ends 54 upon placement and attachment of the rib corner.

As noted, rib corners 52 may also serve in a strengthening capacity, first, by rigidly interconnecting the otherwise separate reinforcement rib sections 20a–d to form a single, circumferential reinforcement structure and, second, to clamp the two rib layers thereby precluding or minimizing rib separation or splitting.

FIGS. 1, 6, and 7 illustrate a preferred form of the rib corners 52 of the present invention. Importantly, the present rib corners may be inexpensively mass-produced —thereby requiring no in-shop or on-site fabrication—and, further, quickly installed, again, consistent with minimizing labor wherever located.

Rib corners 52 define L-shaped 'corners', having upper and lower surfaces 60 and 62 (FIG. 7), which surfaces are adapted to receive and literally grasp the ends regions of the adjoining ribs sections 20. Rib corners 52 may be hand-inserted although use of a mallet or other tool may be required to fully seat the corner snugly against the duct sidewalls (particularly where the corner includes sealing material therein).

Several techniques for securing the rib corners to the duct are contemplated including for example 'dimpling' through the use of an appropriate die or stamp. FIGS. 6 and 7 illustrate yet another and novel approach. One or more semi-circular recesses or cut-outs 64 are formed in the forward edges (two are shown in each edge) of the rib corner thereby exposing the interior-lying rib at 66 therethrough. This exposed rib material is deliberately deformed (by bending, impacting, dimpling, or twisting) to create a protrusions 68, above and/or below the rib, that interferingly engage the rib corner thereby blocking the removal of same.

I claim:

1. An integrally reinforced HVAC duct having four adjoining sides defining four interfaces along the respective intersections of the adjoining sides, the four sides being comprised of at least one sheet metal member, each sheet metal member defining a pair of opposed longitudinal edges extending from a first duct inlet end to a second duct outlet end whereby at least one interface is defined as a seam between said longitudinal edges of the at least one sheet metal member; at least one integral reinforcing rib associated with at least one sheet metal member, the rib oriented between the duct inlet and outlet ends and substantially across at least one side between the opposed interfaces and extending perpendicularly outwardly from the side, the rib being comprised of sheet metal material integrally formed from the single sheet metal member defining the respective side and including integral first and second sheet metal layers whereby the duct may be reinforced without the fabrication and installation of separate reinforcing structures.

2. The integrally reinforced HVAC duct of claim 1 including means for securing together the two layers of each rib whereby the rib remains intact and the layers do not separate under normal duct usage.

3. The integrally reinforced HVAC duct of claim 1 in which at least two adjoining sides include ribs and a relief aperture is formed adjacent the ribs at the interfaces between said adjoining sides.

4. The integrally reinforced HVAC duct of claim 3 including rib corners at each duct interface, each rib corner bridging and interconnected to the ends of the ribs of adjoining sides thereby forming a continuous and stronger reinforcing rib around the full circumference of the duct.

5. The integrally reinforced HVAC duct of claim 4 in which each rib corner includes sealing means therein whereby installation of the rib corner performs the dual function of sealing the rib ends and duct corner and further strengthening the integral duct reinforcement.

6. The integrally reinforced HVAC duct of claim 1 including means for sealing the ends of said integral reinforcement rib and the duct corners against loss of air therefrom.

\* \* \* \* \*